United States Patent Office 2,919,601
Patented Jan. 5, 1960

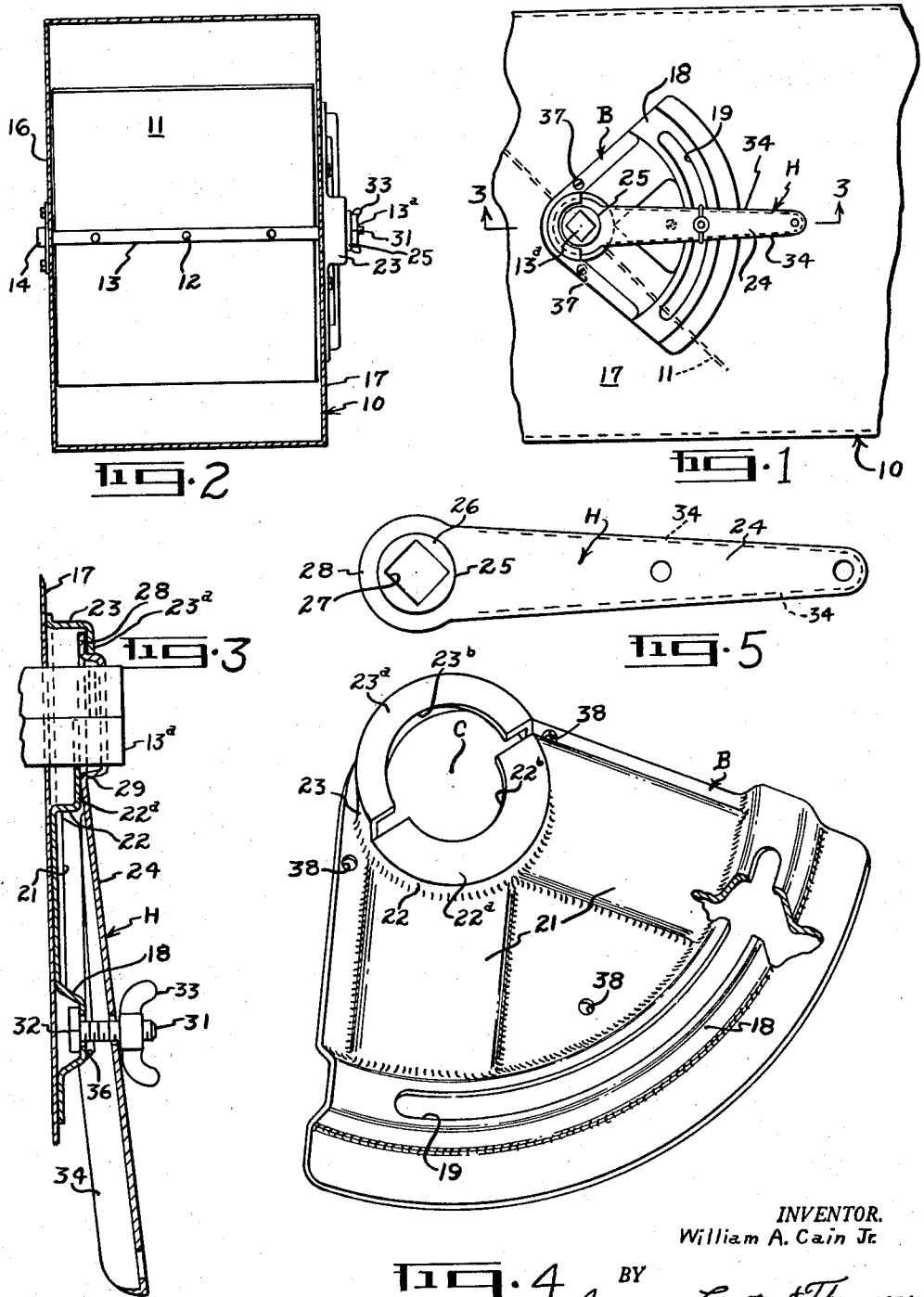

2,919,601

CONTROL AND LOCKING OPERATOR FOR PLATE VALVES

William A. Cain, Jr., Birmingham, Ala.

Application January 26, 1959, Serial No. 788,940

4 Claims. (Cl. 74—531)

This invention relates to an operator for plate valves or dampers of the kind used in air ducts, such for instance as the plate valves used to control or direct hot or cold air moving along the ducts of heating or air conditioning systems.

In this art quadrant type operators for air duct valves consist generally of a base part bearing the quadrant and which is secured to the side of the duct. The valve to be controlled generally is in the form of a relatively thin plate of sheet metal. The valve is provided with a cross bearing rod having one squared end projecting into a squared hole in the movable handle of the device, thus to secure the rod non-rotatably to the handle. The opposite end of the rod is generally mounted in a bearing secured to the opposite wall of the duct. Alternately, stub shafts may be used in place of the cross rod. In either case the setting of the valve can be adjusted by rotating the handle. A wing nut-screw combination serves as means to hold the handle in selected positions.

In air duct constructions there is an almost universal tendency for the control valves to rattle or chatter, resulting in undesirable noise. In such duct systems, even low volume sounds are usually greatly amplified inasmuch as the ducts are natural sounding boards.

In view of the foregoing, it is a prime object of my invention to provide an operator for the plate valves or dampers of air duct systems by means of which rattling or chattering of the valves controlled thereby is substantially eliminated, this being accomplished automatically upon securing the handle in selected position.

A more specific object is to provide a device of the character designated in which there are cooperating cam surfaces on the handle and base portion of the device, effective upon securing the handle locking nut to shift the handle slightly relative to the base, thereby to jam or bind the projecting end of the valve rod against an adjacent part of the base, effectively holding the rod and hence the valve against vibration or chattering, eliminating noise from this source.

A still more specific object is to provide a quadrant type operator of the character designated having parts surrounding the square projecting end of the valve rod effective to be engaged by parts of the handle both to mount the handle for rotation and to serve as a holddown member for the handle, whereby upon securing the outer end of the handle to the base the square end of the rod is effectively pulled tight against the base and held there, thus to prevent rattling of the rod and the valve.

My invention further embodies the details of the base construction for rotatably mounting the handle and a curved raised cam part on the base coacting with a sloping shoulder under the handle to obtain the anti-rattling features already mentioned.

Apparatus illustrating features of my invention is shown in the accompanying drawings, forming a part of this application, in which:

Fig. 1 is a fragmentary side elevational view of a duct having my invention applied thereto;

Fig. 2 is an end sectional view of the duct in Fig. 1 showing my improved valve operator in end view;

Fig. 3 is an enlarged detail sectional view taken generally along line 3—3 of Fig. 1;

Fig. 4 is an isometric view of the base with all of the parts removed, the view being partly broken away and in section; and, Fig. 5 is a plan view of the handle removed from the remaining parts of the device.

Referring now to the drawings for a better understanding of my invention, I show a duct 10 which may be made of sheet metal of usual gauge. In the duct is a damper or plate valve 11 which also may be made of relatively thin sheet metal. The valve 11 may be secured by screws or rivets 12 to a shaft or cross rod 13. The rod 13 may be mounted at one end in a bearing 14 secured to a side 16 of the duct. The rod 13 projects through the opposite side wall 17 of the duct 10 and has a square outer end section 13$^a$.

My improved operator for engaging the square end 13$^a$ and rotating the valve 11 by rotating the rod 13 comprises generally two portions. First, there is a quadrant base portion indicated generally by the letter B and second, a handle H.

The base B may conveniently be die formed from a blank of sheet metal which may be a little heavier than the material of duct walls 16 and 17. As shown, base B has an upstanding, arcuate rib 18, flat on its outer surface, which is struck from the center C. The flat surface of rib 18 is provided with an arcuate opening 19 likewise struck from center C.

Rising above the general level of the plate forming the base B are strengthening ribs 21 which are relatively wide and which extend toward center C as indicated. Rising still further above the level of ribs 21 is a boss, one half 22 of which has a flange 22$^a$ which is generally parallel to the plane of the base B.

The other half 23 of the boss has a flange 23$^a$ also lying in the general plane of the base as a whole. It will be noted that flange 23$^a$ lies at a level above the level of flange 22$^a$. Further, flange 22$^a$ is wider than flange 23$^a$ and both flanges are struck from the common center C. The radius of inner edge 22$^b$ of flange 22$^a$ is equal substantially to the radius of a circle on which would lie the corners of the square end 13$^a$ of the rod 13.

The handle or operator H has an extension or handle part proper indicated at 24 which is long enough to be grasped in the hand to operate the device. At the inner end there is a raised boss 25 having a top or cover portion 26 generally in the plane of the handle as a whole. A squared opening 27 is provided in the cover portion 26 to fit about squared end 13$^a$, thereby to secure the rod 13 non-rotatably to the handle H.

The radius of the outer surface of boss 25 is substantially equal to the radius of curved edge 23$^b$ of flange 23$^a$. Thus, when flange 28 of the handle is inserted under flange 23$^a$, and with squared end 13$^a$ in opening 27 the handle rests as shown in Fig. 3. It will be noted that the part of handle H which joins the boss at 29 rests as a sort of heel or fulcrum point on the wider flange 22$^a$. The handle thus is effectively trapped around squared end 13$^a$ of rod 13 and with its flange 28 under flange 23$^a$ and with portion 29 resting slidably on the outer surface of flange 22$^a$.

A bolt 31 passes through arcuate slot 19 and has a head 32 which fits non-rotatably under rib 18 and yet slidable thereunder. A wing nut 33 serves to draw handle H toward the base.

The handle may have downturned flanges 34 along its edges. Flanges 34 may be notched to form surfaces 36, on a slope generally complementary to the slope of the outer edge of rib 18. Therefore, when wing nut 33 is drawn toward handle H, surfaces 36 and the outer sloping surface of rib 18 act as coacting cam surfaces, thus to shift the handle longitudinally, thereby to bind the squared end 13ª of the rod against the curved surface 22ᵇ of flange 22ª.

From the foregoing, the method of constructing and using my improved apparatus may be readily understood. The device as a whole is fastened to the side of the duct by means of screws 37 which pass through holes 38 in base B. Thus installed, the handle H may now be slipped over the projecting squared end 13ª of rod 13 and with its flange 28 under flange 23ª. It will be understood that prior to installing base B, bolt 31 will have been pushed through slot 19. The wing nut is now installed and is utilized to draw the handle down onto the base with the notch surface 36 camming against the sloping surface of rib 18. This effectively binds square end 13ª against the curved surface 22ᵇ.

It is understood that as a matter of convenience in fabrication the squared hole 27 oftentimes fits rather loosely over the rod end 13ª. Prior to my invention this loose fit has been one of the principal causes of rattling of valve 11 as will be readily appreciated. With my invention, I eliminate rattling inasmuch as the end 13ª is effectively pulled tight in binding fashion against the base, namely against the surface 22ᵇ of the flange 22ª.

While I have described and shown rod 13 as having a "squared" end 13ª, it will be understood that the same may be secured to the handle H by making the end 13ª other than square, such for instance as making it six sided, flat, triangular, or the like, and making the opening 27 complementary thereto. Therefore, in the specification and claims the words "squared end" are intended to include these different shapes for securing the handle to rod 13. Likewise, while I show the base B as being of true quadrant shape, this shape may be varied as desired.

While I have shown my invention in but one form, it will be obvious to those skilled in the art that it is not so limited, but is susceptible of various changes and modifications without departing from the spirit thereof, and I desire, therefore, that only such limitations be placed thereupon as are specifically set forth in the appended claims.

What I claim is:

1. In an operator for duct valves and the like having an end of an operating shaft projecting from a side of the duct, a base disposed to be secured to a side of the duct, there being an opening in the base through which the end of the shaft projects, a handle having an opening therein through which the shaft end projects, said handle being secured substantially non-rotatably on the shaft end, means on the base rotatably mounting the end of the handle through which the shaft passes, a surface on the base against which the shaft is disposed to be tightly engaged upon longitudinal shifting of the handle, and means effective to shift the handle longitudinally and secure it to the base, thereby clamping the shaft tightly against said surface of the base.

2. In an operator for the shafts of duct valves and the like, a base having an opening therein through which a squared end of the shaft projects, said opening being defined by an upstanding boss having a pair of flanges each of which has a generally semi-circular edge facing the other, a handle having an outstanding flange on one end thereof and an upstanding boss adjacent said flange, the edge of one of said pair of flanges being of a radius to fit about the outer surfaces of said boss on the handle, the edge of the second flange being of a radius approximating the distance from the center of the squared shaft end to a corner thereof, said handle boss fitting against the semi-circular edge of the first named base flange and with the handle flange lying under said first named base flange, there being a part on the handle resting on top of the second named base flange, coacting cam means on the base and handle disposed upon securing the handle to the base to shift the handle longitudinally thereby to bind the square end of the shaft against the curved edge of the second named base flange, and means to secure the handle to the base.

3. In an operator for duct valves and the like having a squared shaft, a handle having an upstanding boss adjacent one end, a top wall for the boss having a squared hole therein for substantially non-rotatably connecting the handle to the squared shaft, a circular outstanding flange on the handle near the base of the boss thereon and extending around the adjacent end of the handle, a base having an opening therein for passing the squared end of the shaft, said opening being defined by an upstanding boss having two facing flanges each having generally semi-circular edges, the base flange opposite the handle being located in a plane above the other flange, whereby the flange carried by the handle may be inserted under the said opposite flange, a raised rib on the base struck on a radius from the center of the upstanding boss on the base, said handle having means on its underside cooperating with the rib to shift the handle longitudinally thereby to pull the squared shaft end against the semi-circular edge of the flange nearest the handle, and means to draw the handle toward the base and to lock it against rotation.

4. Apparatus as defined in claim 3 in which the handle is provided with an inturned flange adjacent each side thereof which extends toward the base, and said means on the underside of said handle comprises a notch in each flange which cooperates with the raised rib on the base.

References Cited in the file of this patent

UNITED STATES PATENTS

| | | |
|---|---|---|
| 787,565 | Coryell et al. | Apr. 18, 1905 |
| 867,009 | Brennan | Sept. 24, 1907 |
| 1,256,201 | Clark | Feb. 12, 1918 |
| 2,005,227 | Johnson | June 18, 1935 |
| 2,745,629 | Watson | May 15, 1956 |
| 2,855,798 | Stelljes | Oct. 14, 1958 |